No. 685,922. Patented Nov. 5, 1901.
G. S. LEE.
LUBRICATOR.
(Application filed Aug. 10, 1901.)
(No Model.)
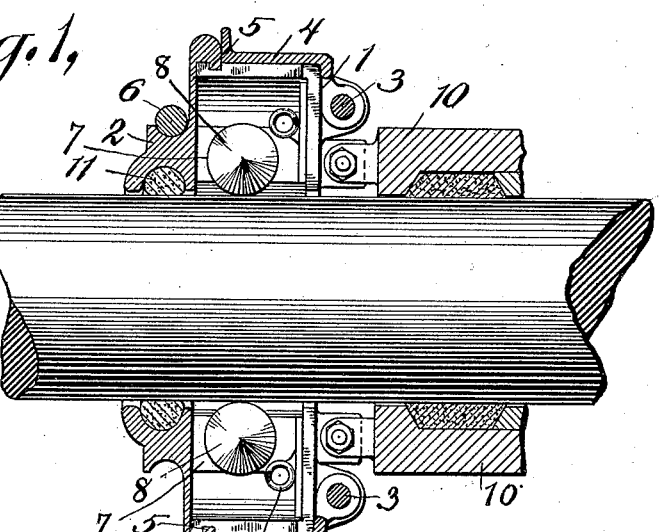
Fig. 1,
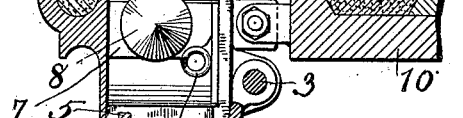
Fig. 2
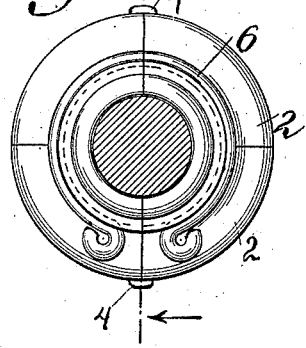
Fig. 3,
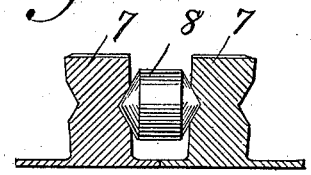
Fig. 4,
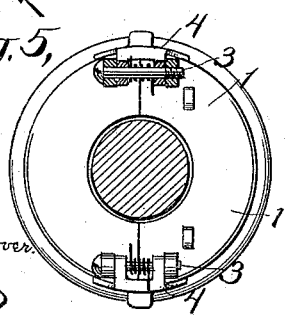
Fig. 5,
WITNESSES:
M. M. Conover
A. H. Peries
INVENTOR
George S. Lee
BY
Chapin & Haywood
His ATTORNEYS
THE NORRIS PETERS CO., PHOTO-LITHO., WASHINGTON, D. C.

UNITED STATES PATENT OFFICE.

GEORGE S. LEE, OF HAWTHORNE, NEW JERSEY.

LUBRICATOR.

SPECIFICATION forming part of Letters Patent No. 685,922, dated November 5, 1901.

Application filed August 10, 1901. Serial No. 71,582. (No model.)

*To all whom it may concern:*

Be it known that I, GEORGE S. LEE, a citizen of the United States of America, and a resident of Hawthorne, in the county of Passaic and State of New Jersey, have invented certain new and useful Improvements in Lubricators, of which the following is a specification, reference being had to the accompanying drawings, forming a part thereof.

My invention relates to improvements in lubricators for sliding rods, shafts, and the like; and it consists in the novel means employed for applying lubricant to such rods and shafts, for distributing the lubricant, for retaining and applying a pasty or semisolid lubricant, so that the device requires attention and filling only at long intervals, in the novel construction of the device whereby it automatically adjusts itself to the rod or shaft to be lubricated without special or accurate fitting, and generally in the novel combination, construction, and arrangement of the parts.

The objects of my invention are to improve the lubrication of sliding rods, shafts, and the like, such as the piston-rods and valve-rods of steam-engines, to facilitate the use of a pasty or semisolid lubricant and to provide for the retention of a considerable quantity of such lubricant, so that the lubricating device requires attention and filling only at long intervals, to apply the lubricant uniformly and evenly and in suitable quantities, to avoid the necessity of accurate fitting of the device to the rod or shaft to which it is to be applied, to cause the device to adapt itself automatically to the rod or shaft to which it is applied, to render the device readily attachable and detachable without disconnection of anything to which the rod or shaft to be lubricated may be attached, and generally to make the lubricating device simple, compact, automatic in action, durable, and as inexpensive as possible.

I will now proceed to describe one form of lubricating device embodying my invention and will then point out the novel features thereof in claims.

In the drawings which accompany and form a part of this specification, Figure 1 is a sectional view of my improved lubricating device applied to a reciprocating rod, such as the piston-rod of an engine. Fig. 2 is a face view of the segmental bearing-blocks and the rolling lubricant-distributers removed from the rod and from their casing, but in substantially their normal relative relation. Fig. 3 is a face view of the cover-plate, showing the sectional construction thereof and the spring-ring for holding its sections together. Fig. 4 is a detail view of a rolling oil-distributer and its segmental bearing-blocks, the latter being shown in section; and Fig. 5 is a rear view of the casing.

In the drawings numeral 1 designates a casing adapted to be closed at one end by a cover-plate and at the other end having a central aperture, through which the rod or shaft to be lubricated may pass. This casing is formed in two sections connected by screws 3, which likewise form pintles for hinged cover-plates 4, covering openings in the sides of the casing, through which the lubricant may be inserted, and in order to facilitate the attachment of the device to an engine or machine already erected the two sections of the casing may be separated and placed upon the rod or shaft to be lubricated and then fastened together again. The cover-plate 2 is likewise formed in two sections for a similar reason and is provided with a flange 5, adapted to enter a groove in the side of the casing for the purpose of securing the cover to the casing. A spring-ring 6, lying within a groove in the cover-plate, holds the sections thereof together and in engagement with the casing and yet permits ready removal of the cover-plate when access to the interior of the lubricating device is desired for any reason.

Within the casing are a series of segmental bearing-blocks 7 and a series of lubricant-distributing rollers 8, together arranged in circular order and adapted to inclose the rod or shaft to be lubricated. The bearing-blocks have conical side recesses, forming bearings for the conical sides of the rollers 8. The depth of these recesses is such as to permit slight enlargement or contraction of the ring formed by the bearing-segments and the rollers without displacement of the rollers from their bearings. The segments are held together by a spring-ring 9, Fig. 1, surrounding them and lying within a shallow groove in the outer side of the ring formed by the segments. When the segment-ring is removed from its casing, the inner faces of the segments incline outwardly by reason of the tension of the spring-ring 9 and are so shown in Fig. 2; but when said segment-ring is in place in the casing and the cover 2 is on said cover presses the segments lightly against the rear end of the casing, bringing the inner faces of the segments parallel with the rod or shaft to be lubricated and bringing the faces of the rollers 8 into contact with such rod or shaft.

The segment-ring is free to move slightly to one side or the other within the casing, and therefore said casing need not be absolutely concentric with the rod or shaft to be lubricated. Likewise slight side motion of such rod or shaft, such as often takes place, is permitted.

In Fig. 1 the lubricating device is shown as attached in front of an ordinary stuffing-box 10; but it may be attached to any suitable support.

The cover-plate 2 is provided with an internal groove adapted to receive a gasket 11, of packing material.

In the operation of the device the casing is filled with grease or other pasty lubricant, and as the rod or shaft to be lubricated moves back and forth the rollers 8 distribute and apply this lubricant, rolling back and forth within their bearings as the rod moves back and forth. The capacity of the casing may be such that it will contain a supply of lubricant sufficient to last for a considerable time, and the rollers insure the distribution of the lubricant in proper quantity on the rod or shaft so long as there is any lubricant in contact with said rollers. Lubricant may be supplied to the device from time to time through the openings normally closed by the covers 4.

Since the segments 7 may be separated slightly without displacement of the distributing-rollers from their bearings, the device adjusts itself automatically to slight differences in sizes of rods to which it may be applied and does not require fitting.

It is obvious that the device herein illustrated and described is capable of many modifications and changes in construction, and I do not limit myself to the particular construction herein shown and described.

What I claim is—

1. In a lubricating device, the combination, with a casing, adapted to surround a shaft or rod having a sliding motion, of bearing-blocks therein, said blocks having a free movement in every direction in a plane transverse of the path of sliding movement of the shaft or rod to be lubricated, rotary lubricant-distributers having bearings in said blocks and arranged to be rotated longitudinally of the device to be lubricated, by contact with the latter, and means for pressing said distributers against the surface to be lubricated.

2. In a lubricating device, the combination with a casing adapted to surround a shaft or rod having a sliding motion, of bearing-blocks therein, said blocks having a free movement in every direction in a plane transverse of the path of sliding movement of the shaft or rod to be lubricated, rotary distributing-rollers having bearings in said blocks and arranged to be rotated longitudinally of the device to be lubricated, by contact with the latter, and means for pressing said rollers against the surface to be lubricated.

3. In a lubricating device, the combination, with a casing adapted to surround a shaft or rod having a sliding motion, of separable bearing-blocks therein, said blocks having a free movement in every direction in a plane transverse of the path of sliding movement of the shaft or rod to be lubricated, rotary lubricant-distributers having bearings in said blocks and arranged to rotate longitudinally of the device to be lubricated, and means for pressing said distributers against the surface to be lubricated.

4. In a lubricating device, the combination with a casing adapted to surround a shaft or rod having a sliding motion, of separable segmental bearing-blocks and rotary lubricant-distributers together forming a ring adapted to surround the device to be lubricated, said distributers having bearings in said blocks, and means for pressing said distributers against the surface to be lubricated.

5. In a lubricating device, the combination with a casing adapted to surround a shaft or rod having a sliding motion, of separable segmental bearing-blocks and rotary lubricant-distributers together forming a ring adapted to surround the device to be lubricated, said distributers having bearings in said blocks, and a spring-ring embracing said ring and adapted to press the distributers against the surface to be lubricated.

6. In a lubricating device, the combination with a casing adapted to surround a shaft or rod having a sliding motion, of separable segmental bearing-blocks having conical side bearing-recesses, and distributing-rollers having conical sides fitting within said recesses, said blocks and rollers together forming a ring adapted to surround the device to be lubricated, and means for pressing the blocks and rollers toward the center.

7. In a lubricating device, the combination of separable bearing-blocks and rotary distributers intermediate of said blocks and having bearings therein, and together forming a ring adapted to embrace a device to be lubricated, and means for holding the blocks and distributers together.

8. In a lubricating device, the combination with a casing adapted to surround a shaft or rod having a sliding motion, of a distributing-ring within said casing but having free lateral motion therein, and adapted to surround the device to be lubricated, and having rotary distributers arranged to be rotated longitudinally of the device to be lubricated by contact with the latter.

9. In a lubricating device, the combination with a sectional casing adapted to be placed in sections around a rod or shaft to be lubricated, and a sectional cover therefor, and means for holding together the sections of the casing and cover, of a distributing-ring within said casing having rotary distributers, said ring surrounding the device to be lubricated and its distributers being arranged to rotate longitudinally of the device to be lubricated.

10. In a lubricating device, the combination with a casing adapted to surround a shaft or rod having a sliding motion, said casing having filling-openings, and covers for said openings, of a distributing-ring within said casing adapted to surround the device to be lubricated and provided with rotary distributers arranged to rotate longitudinally of the device to be lubricated.

GEORGE S. LEE.

Witnesses:
A. J. SANGSTER,
J. B. CONGER.